United States Patent
Agrawal et al.

(10) Patent No.: US 12,210,821 B2
(45) Date of Patent: Jan. 28, 2025

(54) MANAGE COMPUTATIONAL POWER AND DISPLAY RESOURCES OF CONNECTED DEVICES

(71) Applicant: MOTOROLA MOBILITY LLC, Wilmington, DE (US)

(72) Inventors: Amit Kumar Agrawal, Bangalore (IN); Gabriele Baldissara, Milan (IT)

(73) Assignee: Motorola Mobility LLC, Chicago, IL (US)

( * ) Notice: Subject to any disclaimer, the term of this patent is extended or adjusted under 35 U.S.C. 154(b) by 33 days.

(21) Appl. No.: 18/343,057

(22) Filed: Jun. 28, 2023

(65) Prior Publication Data
US 2025/0005273 A1   Jan. 2, 2025

(51) Int. Cl.
G06F 3/048 (2013.01)
G06F 9/50 (2006.01)
G06F 40/18 (2020.01)

(52) U.S. Cl.
CPC ............ G06F 40/18 (2020.01); G06F 9/5044 (2013.01)

(58) Field of Classification Search
CPC .............................. G06F 40/18; G06F 9/5044
See application file for complete search history.

(56) References Cited

U.S. PATENT DOCUMENTS

| | | | | |
|---|---|---|---|---|
| 7,350,141 B2* | 3/2008 | Kotler | ............ | G06F 40/103 715/209 |
| 9,922,023 B2* | 3/2018 | Drake | ............ | G06F 40/143 |
| 10,579,589 B2* | 3/2020 | Gandhi | ............ | G06F 16/148 |
| 10,789,378 B1* | 9/2020 | Karpel | ............ | G06F 21/629 |
| 11,520,550 B1* | 12/2022 | Bushnell | ............ | H04R 5/04 |
| 11,544,451 B2* | 1/2023 | Broad | ............ | G06F 40/197 |
| 11,983,490 B1* | 5/2024 | Rattan | ............ | G06F 40/18 |
| 2010/0179898 A1* | 7/2010 | Wade | ............ | G06Q 30/0283 705/400 |
| 2010/0287219 A1* | 11/2010 | Caso | ............ | G06F 16/134 717/176 |
| 2014/0280402 A1* | 9/2014 | Tomich | ............ | G06F 16/16 707/827 |
| 2015/0363414 A1* | 12/2015 | Acharyya | ............ | G06F 11/1464 707/821 |
| 2016/0285728 A1* | 9/2016 | Jhoney | ............ | H04L 41/069 |
| 2019/0370321 A1* | 12/2019 | Bisceglie | ............ | G06F 16/176 |
| 2021/0342785 A1* | 11/2021 | Mann | ............ | G06F 40/186 |
| 2022/0092058 A1* | 3/2022 | Vijayan | ............ | G06F 16/2386 |

* cited by examiner

Primary Examiner — Linh K Pham
(74) Attorney, Agent, or Firm — Isidore PLLC

(57) ABSTRACT

An electronic system, method, and computer program product coordinate processing and presentation of computer data file to a user by multiple devices that are wirelessly connectable in order to processing and processing requirements of computer data file (e.g., media or multiple spreadsheet file). An electronic device identifies available computational and presentation resources included connected second device(s) to enable coordinated operation. The electronic device segregates the computer data file into multiple segregable functional portions and executes and presents first segregable functional portion(s). The electronic device communicates second segregable function portion(s) to the second device(s) and triggers processing and presenting by the second electronic device(s).

20 Claims, 6 Drawing Sheets

Segregate the computer data file into multiple segregable functional portions by splitting the computer data file to generate the at least one first segregable functional portion and the at least one second segregable functional portion
520

Assigns the at least one first segregable functional portion and the at least one second segregable functional portion, based on the respective computation and presentation capabilities of the display of the electronic system and the at least one second device
522

Execute the first application to process at least one first segregable functional portion of the computer data file
524

Present on the display the at least one first segregable functional portion in a user interface of the first application
526

Communicate at least one second segregable functional portion of the computer data file, via the communication subsystem, to the at least one second device for processing and presenting
528

Trigger, via the communication exchange, the at least one second device to execute the second application to process and present the second segregable functional portion of the computer data file
530

Processing of the computer data file completed?
532
N / Y

Receive, via the communication subsystem from the at least one second device, the at least one second segregable functional portion as modified at the at least one second device
534

Generate a modified computer data file by assembling the at least one first and the at least one second segregable functional portions, as respectively modified
536

Store the modified computer data file
538

END

*FIG. 5B*

MANAGE COMPUTATIONAL POWER AND DISPLAY RESOURCES OF CONNECTED DEVICES

BACKGROUND

1. Technical Field

The present disclosure relates generally to personal electronic devices that communicatively couple to other electronic devices, and in particular to connectable personal electronic devices that use resources of second connected devices.

2. Description of the Related Art

With advances in electronic technology, individuals have been able to work with larger and larger computer data files that require computationally intensive processing and presentation capabilities. In an example, desktop workstations include multicore processing subsystems that can handle processing tasks required for database creation and multimedia editing. Even with increased computing speeds and component miniaturization, large stationary workstations with high-capacity data processing and large display monitors or multiple monitors are required to support processing and presentation of certain computer data files.

In parallel with these developments, individuals increasingly rely upon having a number of more portable or mobile electronic devices such as mobile phones, tablet, and laptops. Computational capabilities of mobile devices has increased over time but tends to be limited by the amount of stored power and thermal cooling that is available to mobile devices. Being portable, output devices such as mobile displays and speakers tend to be small and limited in capabilities. To compensate in certain scenarios, users can connect to external output devices to provide larger displays and better sound output. For most purposes, having an array of personal electronic devices satisfies requirements for communication and social information gathering. Scaled down versions of productivity software has been made available on mobile platforms, but generally mobile devices are not used in direct competition to the work performed by workstations designed for computation and presentation intensive uses.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 5A-5B (collectively "FIG. 5") are a flow diagram presenting a method of managing computation and presentation capabilities of connected devices, according to one or more embodiments.

DETAILED DESCRIPTION

Figure 1:
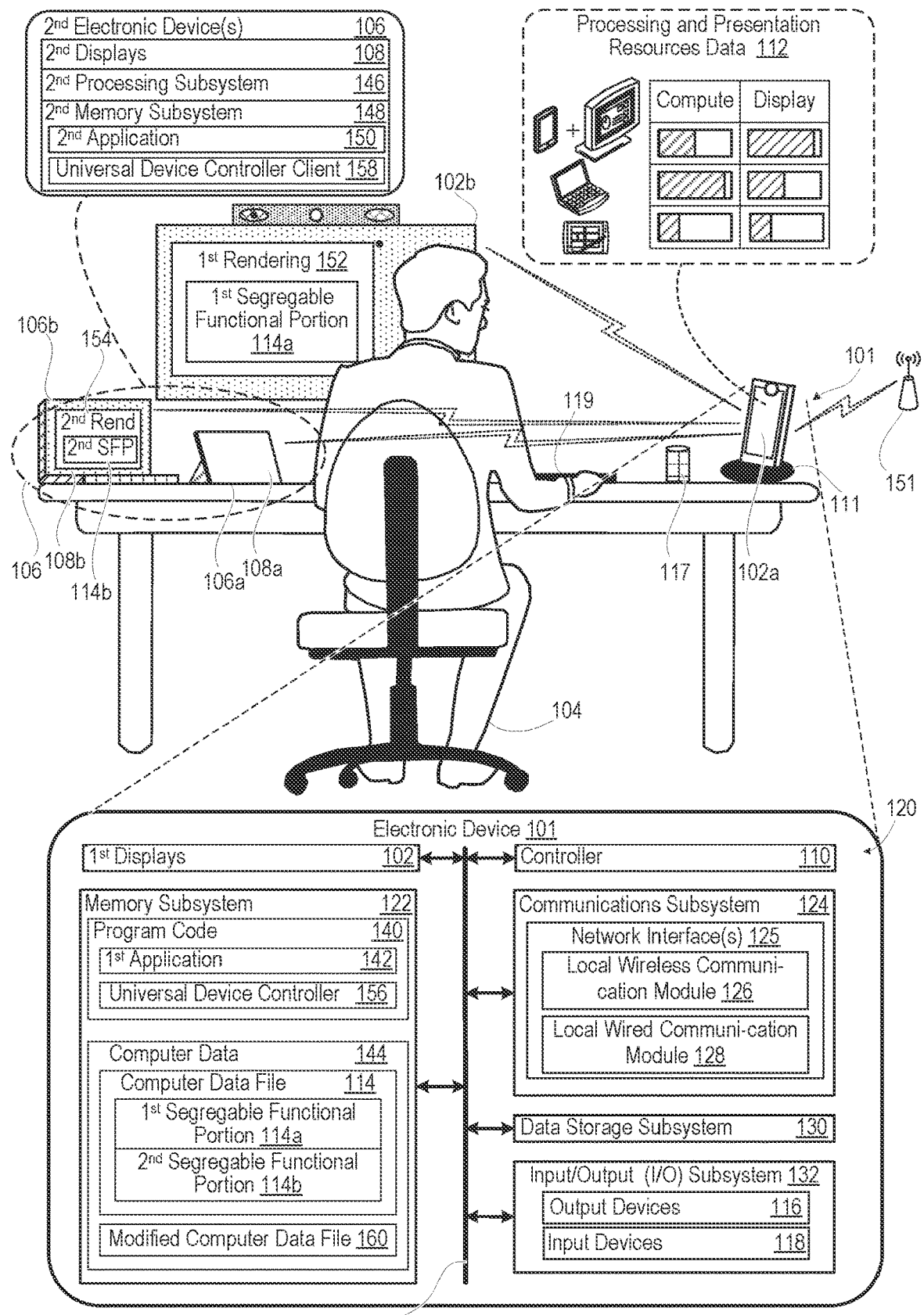
FIG. 1 depicts a simplified functional block diagram of an electronic system including an electronic device connected to external devices and to second electronic devices for collaborative processing and presenting of a workload, according to one or more embodiments.

According to aspects of the present disclosure, an electronic system, a method, and a computer program product manages computation and presentation capabilities of connected devices. While the individual devices are separately inadequate to process and present a large (processing and/or presentation intensive) computer data file, a user can communicatively connect the devices in order to concurrently control and view processing of the computer data file using the more than one connected devices, controlled by a single primary device. In one or more embodiments, the electronic system includes a memory that stores a first application configured to process and present at least one portion of a computer data file. The electronic system includes a communications subsystem that is configurable to connect the electronic system to one or more second devices having a processing subsystem, a second display, and a second memory that stores a second application. A controller of the electronic system is communicatively connected to the memory and the communications subsystem. The controller identifies availability of computational and presentation resources of at least one second device to enable coordinated operation of both the electronic system and the at least one second device to process the computer data file. The controller configures the communications subsystem to connect to the at least one second device. The controller segregates the computer data file into multiple segregable functional portions. The controller executes the first application to process at least one first segregable functional portion of the computer data file. The controller presents the at least one first segregable functional portion on a display. The controller communicates at least one second segregable functional portion of the computer data file, via the communications subsystem, to the at least one second device for processing and presenting. The controller triggers the at least one second device to process and present the second segregable functional portion of the computer data file.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 2:
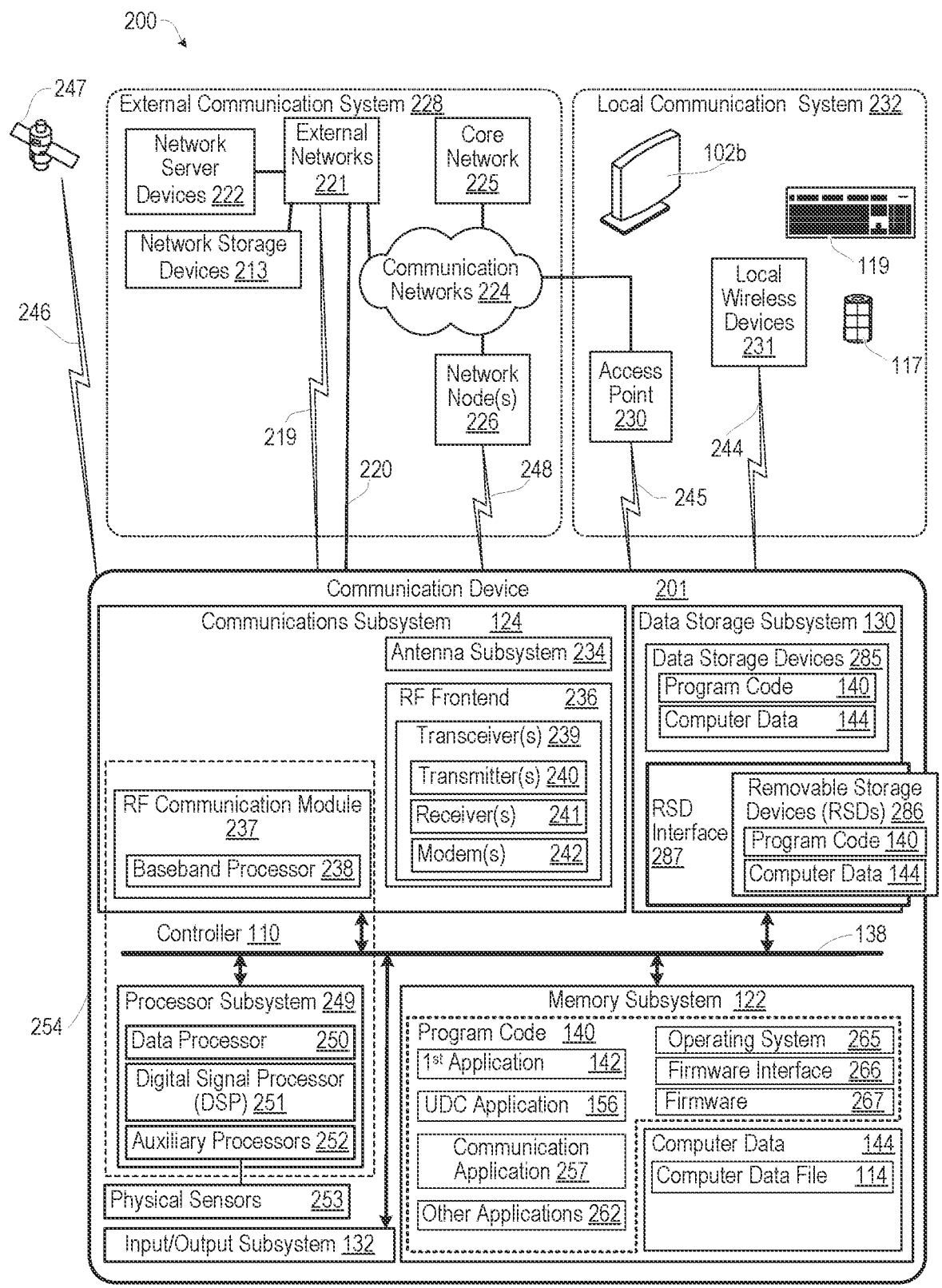
FIG. 2 presents a functional block diagram of a communication device as an implementation of the electronic device of FIG. 1 with additional communication capabilities, according to one or more embodiments.

FIG. 1 depicts electronic system 100 that has first display(s) 102 available for user 104 to view. In one or more embodiments, electronic system 100 is entirely or essentially electronic device 101 having first display 102*a*. In one or more embodiments, electronic system 100 includes electronic device 101 and one or more first external displays 102*b* that are communicatively coupled and external to electronic device 101. Electronic device 101 is communicatively connectable to second electronic device(s) 106, which have respective second displays 108 also available for user 104 to view. Controller 110 of electronic device 101 manages coordinated processing by "first" electronic device 101 and second electronic device(s) 106 and presentation to user 104 via first and second displays 102 and 108. FIG. 2 presents a communication environment 200 with a functional block diagram of communication device 201 having additional communication capabilities and in which the features of the present disclosure are advantageously implemented. Communication device 201 is an implementation of electronic device 101 of FIG. 1. Communication device 201 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 201 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

With continued reference to FIG. 1, in an example, electronic device 101 and second electronic device(s) 106 are personal user devices that may be best suited for different scenarios but are local and available to be used collaboratively. First and second electronic devices 101 and 106 have one or more dedicated first and second displays 102 and 108 respectively available and viewable by user 104. The dedicated displays (102 and 108) may be integral respectively to first and second electronic devices 101 and 106 or communicatively connectable respectively to first and second electronic devices 101 and 106. In one example, electronic device 101 is placed in dock 111. Electronic device 101 is a handheld user device with first display 102*a* that is an integral touch display and that is the smallest display available to user 104. Electronic device 101 is communicatively coupled to first external display 102*b* that is an external display monitor and that is the largest display viewable by user 104. Second electronic device(s) 106 may include tablet 106*a* that that has second display 108*a* that is an integral touch display and that is larger than first display 102*a* but smaller than first external display 102*b*. Second electronic device(s) 106 may include laptop 106*b* that includes second display 108*b*, which is larger than first display 102*a* and second display 108*a* but smaller than first external display 102*b*. In other embodiments, electronic device 101 may have a form factor of a larger device with a larger integral display, such as second electronic devices 106. Alternatively, or in addition to visually presenting content via first and second displays 102 and 108, electronic device 101 may present audio or tactile outputs using integral or external output devices 116, such as external wireless speaker 117. Electronic device 101 may receive user input using integral or external input devices 118, such as external wireless keyboard 119.

Electronic system 100 and second device(s) 106 may differ in available computing capacity based on hardware and software limitations, thermal dissipation limitations, stored power limitations, and active processing workloads. Controller 110 determines computational and presentation resources data 112 of electronic device 101 and second electronic device(s) 106 (e.g., tablet 106*a* and laptop 106*b*). Presentation capability of electronic system 100 may be based solely on presentation capability of electronic device 101 having integral display capability represented by first display 102*a*. Presentation capability of electronic system 100 that includes electronic device 101 and first external display 102*b* may be based on the system's ability to use display capability of the external display such as first external display 102*b*. Presentation capability of electronic system 100 may be based on total available display size of multiple displays that can be controlled simultaneously by electronic device 101, such as first displays 102*a* and first external display 102*b*. In an example, laptop 106*b* has the highest processing capability available for collaboration and tablet 106*a* as the lowest. For clarity, electronic devices 101, tablet 106*a* and laptop 106*b* are depicted as presenting content on one display. However, display capability can include an ability to present on multiple displays simultaneously with the total display size being a combined display size.

In addition to controller 110, functional components 120 of electronic device 101 include memory subsystem 122, communications subsystem 124 having network interfaces 125 such as local wireless communications module 126 and local wired communications module 128, data storage subsystem 130, and input/output (I/O) subsystem 132 having output devices 116 and input devices 118. To enable management by controller 110, system interlink 138 communicatively connects controller 110 with memory subsystem 122, communications subsystem 124, data storage subsystem 130, and I/O subsystem 132. System interlink 138 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 138) are illustrated in FIGS. 1 and 2, it is to be understood that more, fewer, or different interconnections may be present in other embodiments.

According to aspects of the present disclosure, memory subsystem 122 stores program code 140 such as first application 142 configured to process and present computer data 144 such as at least one portion of computer data file 114. In one or more embodiments, first application 142 is further configured to perform one or more file or media operations such as loading, opening, visually presenting, editing, and saving computer data file 114. Communications subsystem 124 is configurable to connect electronic device 101 to one or more second devices 106, each having second processing subsystem 146, second memory subsystem 148 that stores second application 150, and second display 108. Second application 150 is also configured to process and present at least a portion of computer data file 114. In one or more embodiments, second application 150 is further configured to perform one or more file or media operations such as loading, opening, visually presenting, editing, and saving computer data file 114. First and second applications 142 and 150 may be the same application, a similar application by the same software provider that is configured to work on different computing platforms, or different applications from different software providers but configured to process the same type(s) of computer data files. First and second applications 142 and 150 may differ in capabilities, such as doing a different subset of file or media operations such as loading, opening, visually presenting, editing, and saving computer data file 114.

Controller 110 identifies availability of computational and presentation resources of at least one second device 106 to enable coordinated operation of both electronic device 101 and at least one second device 106 to process and/or present computer data file 114. In an example, electronic system 100 includes electronic device 101 and at least one second device 106 that have been previously connected by user 104, creating trusted peer-to-peer relationships between electronic device 101 and at least one second device 106. Controller 110 configures communications subsystem 124 to connect to at least one second device 106. In an example, controller 110 connects to at least one second device 106 automatically in response to detecting a requirement for additional processing or presentation capability. In one or more embodiments, user 104 has triggered connection of electronic device 101 to at least one second device 106 for other purposes such as sharing notifications and sharing network communication capabilities. Controller 110 may reconfigure an existing connection to include a data connection in support of the application for augmenting processing and/or presentation. In one or more embodiments, the automatic connection is for just adding additional presentation capability, using a second device 106 that is not configured or available for augmenting processing capability. In one or more embodiments, the automatic connection is for just adding additional processing capability, using a second device 106 that is not configured or available for augmenting presentation capability. First and second electronic devices 101 and 106 may be directly connected or indirectly connected via one or more communication nodes 151. Controller 110 segregates computer data file 114 into multiple segregable functional portions 114*a* and 114*b*. Controller 110 executes first application 142 to process at least one first segregable functional portion 114*a* of computer data file 114. Controller 110 presents first rendering 152 based on at least one first segregable functional portion 114*a* on first external display 102*b*. Controller 110 communicates at least one second segregable functional portion 114*b* of computer data file 114, via communications subsystem 124, to at least one second device 106, such as laptop 106*b*, for processing and presenting. Controller 110 triggers at least one second device 106 to execute second application 150 to process and present, via second display 108*b*, second rendering 154 based on second segregable functional portion 114*b* of computer data file 114. As described below regarding FIG. 4, the renderings 152 and 154 may be one or more humanly perceptible modes such as visual, aural, and tactile.

In one or more embodiments, electronic system 100 controls second communication devices 106 using universal device controller (UDC) technology. UDC technology may be used to interface to consumer electronic devices which respond to external control requests or exposes status information. According to aspects of the present disclosure, UDC technology may provide for remote control of personal electronic devices that have full user interface capabilities of their own unlike simpler consumer electronic device. The UDC technology acts as an intermediary between electronic system 100 and slave devices such as second electronic devices 106 that are controlled by electronic system 100. In one or more embodiments, memory subsystem 122 of first electronic device 101 stores universal device controller application 156. Each second electronic device 106 stores universal device controller client application 158 in corresponding second memory subsystem 148. Controller 110 executes universal device controller application 156 to configure communications subsystem 124 to support a communication exchange with at least one second device 106, which executes universal device controller client application 158. Controller 110 triggers, via the communication exchange, at least one second device 106 to execute second application 150. Controller 110 segregates computer data file 114 in response to determining additional processing capability to enable efficient processing of computer data file 114 than is currently available for allocation within electronic device 101. In one or more embodiments, controller 110 segregates computer data file 114 in response to determining additional display capability is required to present computer data file 114 in a user interface generated by first application 142.

In one or more embodiments, controller 110 determines respective computational capabilities of electronic device 101 and at least one second device 106 to perform one or more file or media operations (e.g., loading, opening, visually presenting, editing, and saving computer data file 114). Controller 110 splits computer data file 114 to generate at least one first segregable functional portion 114a and at least one second segregable functional portion 114b and assigns at least one first segregable functional portion 114a and at least one second segregable functional portion 114b based on the respective computation capabilities of electronic device 101 and the at least one second device 106. In an example, controller 110 logically splits the files into multiple segments based on a computational matrix of each connected device to provide multi-window views/edits of specific section/records/structures/portions of the file on different devices. In one or more particular embodiments, controller 110 communicatively couples to first external display 102b via communications subsystem 124. Controller 110 identifies presentation resources of electronic system 100, which includes first external display 102b. Controller 110 splits computer data file 114 to generate at least one first segregable functional portion 114a and at least one second segregable functional portion 114b and assigns at least one first segregable functional portion 114a and at least one second segregable functional portion 114b based at least in part on the respective presentation capabilities of first external display 102b and second display 108 of at least one second device 106.

In one or more embodiments, in response to identifying a completion of processing computer data file 114, controller 110 receives, via communications subsystem 124 from at least one second device 106, at least one second segregable functional portion 114b as modified at second device(s) 106. Controller 110 generates modified computer data file 160 by assembling at least one first and at least one second segregable functional portions 114a-114b, as respectively modified. Controller 110 stores modified computer data file 160, e.g., in memory subsystem 122 or other storage location (e.g., cloud storage).

In one or more embodiments, controller 110 identifies availability of computational and presentation resources of at least one second device 106 based on first identifying at least one second device 106 as a trusted peer-to-peer device. Controller 110 configures communications subsystem 124 to connect to the at least one second device 106 via a secure peer-to-peer connection. In one or more embodiments, the communicative coupling between devices is a cloud or network connection. In one or more particular embodiments, computer data file 114 is stored at a network storage location accessible via one or more communication nodes 151. Controller 110 communicates at least one second segregable functional portion 114b to at least one second electronic device 106 by providing retrieval information at the network storage location to the at least one second electronic device 106.

With continued reference to FIG. 2, communication device 201 may include capabilities of communications subsystem 124 to use multiple modes of communication. In one or more embodiments, communication device 101 may include all of the components and functionality described for electronic device 101. In one or more embodiments, communications subsystem 124 communicatively couples communication device 201, respectively via wireless connection 219 or network cable 220, to external networks 221. Communication device 201 may connect, via external networks 221, to network storage devices 213 that store computer data and/or to network server devices 222 that facilitate access to network storage devices 213. Network server devices 222 may have identical or similar components and functionality as described above for communication device 201. Communication device 201 may communicate with second electronic devices 106 (FIG. 1) via external networks 221 or via communication networks 224 that are supported by core networks 225. Network interface(s) 125 (FIG. 1) may include a network interface controller (NIC) and support one or more network communication protocols. External networks 221 can include a local area network (LAN), a campus area network (CAN), a metropolitan area network (MAN), or a wide area network (WAN). For example, network cable 220 can be an Ethernet connection/cable.

In one or more embodiments, communications subsystem 124 may include additional functionality for communicating, using a cellular connection, with network node(s) 226 of external communication system 228 and for communicating, using a wireless connection, with wireless access point 230 or local wireless devices 231 of local communication system 232. Examples of local wireless devices 231 may include first external display 102b, external wireless speaker 117, and external wireless keyboard 119. Communications subsystem 124 includes antenna subsystem 234. Communications subsystem 124 includes radio frequency (RF) front end 236 and RF communication module 237 having baseband processor 238. RF front end 236 includes transceiver(s) 239, which includes transmitter(s) 240 and receiver(s) 241. RF front end 236 further includes modem(s) 242. Baseband processor 238 of RF communication module 237 communicates with controller 110 and RF front end 236. Baseband processor 238 operates in a baseband frequency range to encode data for transmission and decode received data, according to a communication protocol. Modem(s) 242 modulates baseband encoded data from RF communication module 237 onto a carrier signal to provide a transmit signal that is amplified by transmitter(s) 240. Modem(s) 242 demodulates each signal received using antenna subsystem 234 from external communication system 228 or local communication system 232. The received signal is amplified and filtered by receiver(s) 241, which demodulates received encoded data from a received carrier signal.

In one or more embodiments, controller 110, via communications subsystem 124, performs multiple types of cellular over-the-air (OTA) or wireless communication with local communication system 232. Communications subsystem 124 can communicate via an OTA connection 244 with local wireless devices 231. In an example, OTA connection 244 is a Bluetooth connection, or other personal access network (PAN) connection. In one or more embodiments, communications subsystem 234 communicates with one or more locally networked devices via a wireless local area network (WLAN) link 245 supported by access point 230. In one or more embodiments, access point 230 supports communication using one or more IEEE 802.11 WLAN protocols. Access point 230 is connected to communication networks 224 via a cellular or wired connection. In one or more embodiments, communications subsystem 124 receives downlink channels 246 from GPS satellites 247 to obtain geospatial location information. Communications subsystem 124 can communicate via an over-the-air (OTA) cellular connection 248 with network node(s) 226.

Controller 110 includes processor subsystem 249, which includes one or more central processing units (CPUs), depicted as data processor 250. Processor subsystem 249 can include one or more digital signal processors 251 that can be integrated with data processor 250. Processor subsystem 249 can include other processors that are communicatively coupled to data processor 250, such as baseband processors 238 of communication module 237. In another example, auxiliary processors 252 may act as a low power consumption, always-on sensor hub for physical sensors 253. In one or more embodiments that are not depicted, controller 110 can further include distributed processing and control components that are external to housing 254 or grouped with other components, such as I/O subsystem 132. Data processor 250 is communicatively coupled, via system interlink 138, to memory subsystem 122. In one or more embodiments, data processor 250 is communicatively coupled via system interlink 138 to communications subsystem 124, data storage subsystem 130 and I/O subsystem 132. Controller 110 manages, and in some instances directly controls, the various functions and/or operations of communication device 201. These functions and/or operations include, but are not limited to including, application data processing, communication with second communication devices, navigation tasks, image processing, and signal processing. In one or more alternate embodiments, communication device 201 may use hardware component equivalents for application data processing and signal processing. For example, communication device 201 may use special purpose hardware, dedicated processors, general purpose computers, microprocessor-based computers, micro-controllers, optical computers, analog computers, dedicated processors and/or dedicated hard-wired logic.

Memory subsystem 122 stores program code 140 for execution by processor subsystem 249 to provide the functionality described herein. Program code 140 includes applications such as first application 142, universal device controller application 156, communication application 257 and other applications 262. In one or more embodiments, several of the described aspects of the present disclosure are provided via executable program code of applications executed by controller 110. In one or more embodiments, program code 140 may be integrated into a distinct chipset or hardware module as firmware that operates separately from executable program code. Portions of program code 140 may be incorporated into different hardware components that operate in a distributed or collaborative manner. Implementation of program code 140 may use any known mechanism or process for doing so using integrated hardware and/or software, as known by those skilled in the art. Program code 140 may access, use, generate, modify, store, or communicate computer data 144, such as computer data file 114.

Computer data 144 may incorporate "data" that originated as raw, real-world "analog" information that consists of basic facts and figures. Computer data 144 includes different forms of data, such as numerical data, images, coding, notes, and financial data. Computer data 144 may originate at communication device 201 or be retrieved by communication device 201. Communication device 201 may store, modify, present, or transmit computer data 144. Computer data 144 may be organized in one of a number of different data structures. Common examples of computer data 144 include video, graphics, numeric data, text, images, and formatted data, such as a spreadsheet, as discussed herein. Computer data 144 can also be in other forms of flat files, databases, and other data structures.

Memory subsystem 122 further includes operating system (OS) 265, firmware interface 266, such as basic input/output system (BIOS) or Uniform Extensible Firmware Interface (UEFI), and firmware 267, which may be considered as program code 140.

Data storage subsystem 130 of communication device 201 includes data storage device(s) 285. Controller 110 is communicatively connected, via system interlink 138, to data storage device(s) 285. Data storage subsystem 130 provides program code 140 and computer data 144 stored on non-volatile storage that is accessible by controller 110. For example, data storage subsystem 130 can provide a selection of program code 140 and computer data 144. These applications can be loaded into memory subsystem 122 for execution/processing by controller 110. In one or more embodiments, data storage device(s) 285 can include hard disk drives (HDDs), optical disk drives, and/or solid-state drives (SSDs), etc. Data storage subsystem 130 of communication device 201 can include removable storage device(s) (RSD(s)) 286, which is received in RSD interface 287. Controller 110 is communicatively connected to RSD 286, via system interlink 138 and RSD interface 287. In one or more embodiments, RSD 286 is a non-transitory computer program product or computer readable storage device. Controller 110 can access data storage device(s) 285 or RSD 286 to provision communication device 201 with program code 140.

Figure 3:
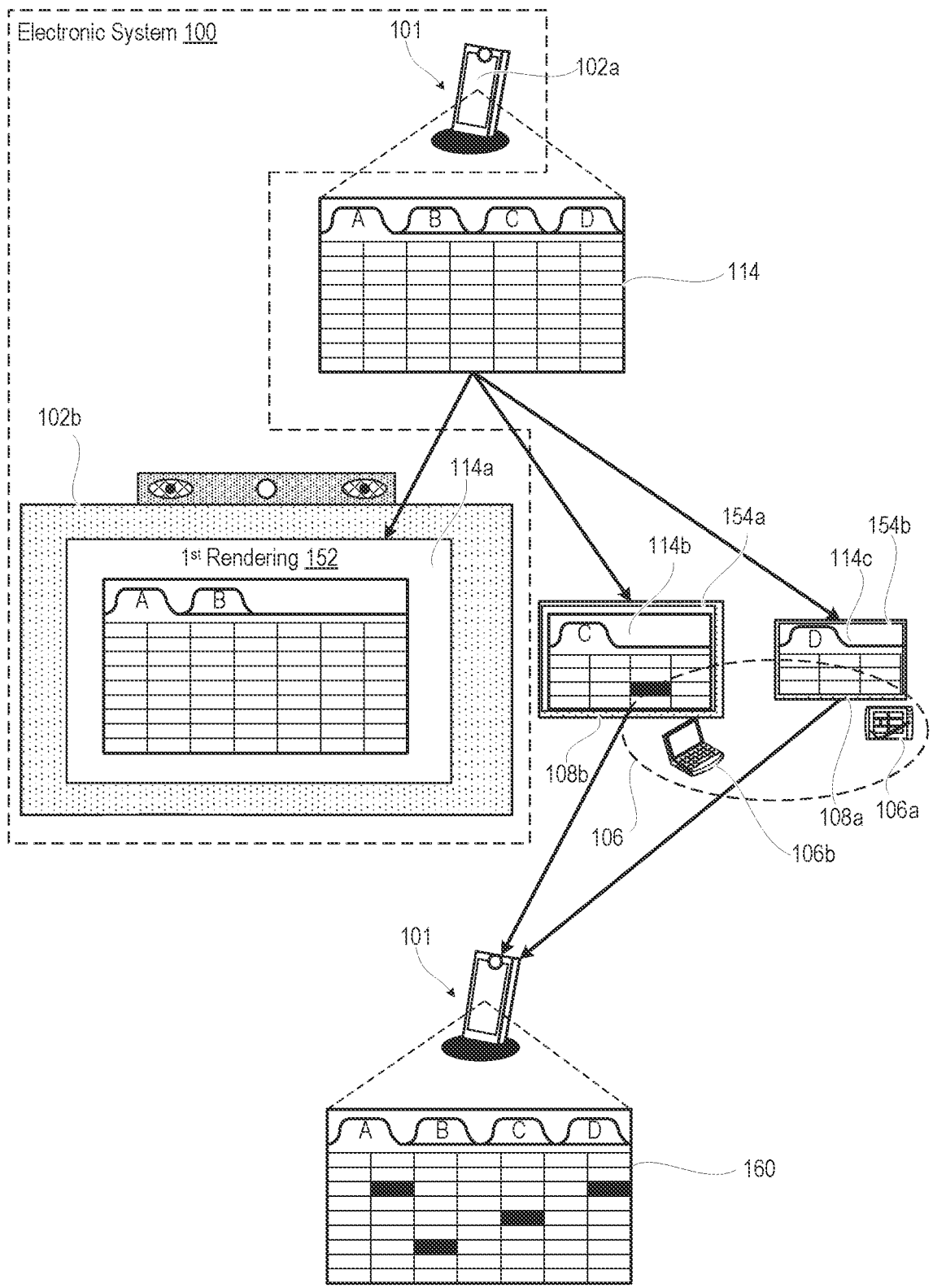
FIG. 3 is a diagram of the electronic system managing segregation and desegregation of a multiple tab spreadsheet workbook, according to one or more embodiments.

FIG. 3 is a diagram of electronic system 100 including electronic device 101, such as communication device 201 (FIG. 2), managing segregation and desegregation of computer data file 114, which in the illustrated example is a multiple tab spreadsheet workbook. In other examples, the computer data file 114 is a word processing files, presentation graphical files, or other office productivity data file. In an example, electronic device 101 segregates computer data file 114 into first segregable functional portion 114a that includes two tabs "A" and "B". Electronic device 101 processes first segregable functional portion 114a and presents first rendering 152 on first external display 102b. Electronic device 101 segregates computer data file 114 into two other segregable functional portions, second and third segregable functional portions 114b, 114c that respectively includes tabs "C" and "D" that are communicated to two second electronic devices 106. In particular, electronic device 101 communicates second segregable functional portion 114b to laptop 106b and communicates third segregable functional portion 114c to tablet 106a. Electronic device 101 communicates user inputs received that affect processing and presentation of the assigned portions 114b, 114c. Electronic device 101 triggers laptop 106b and tablet 106a to respectively present second renderings 154a-154b. When electronic device 101 determines that processing of each of second and third portions 114b, 114c is complete, electronic device 101 receives any modifications for each of first, second, and third portions 114a-114c performed respectively by electronic device 101, laptop 106b, and tablet 106a, and assembles modified computer data file 160.

Figure 4:
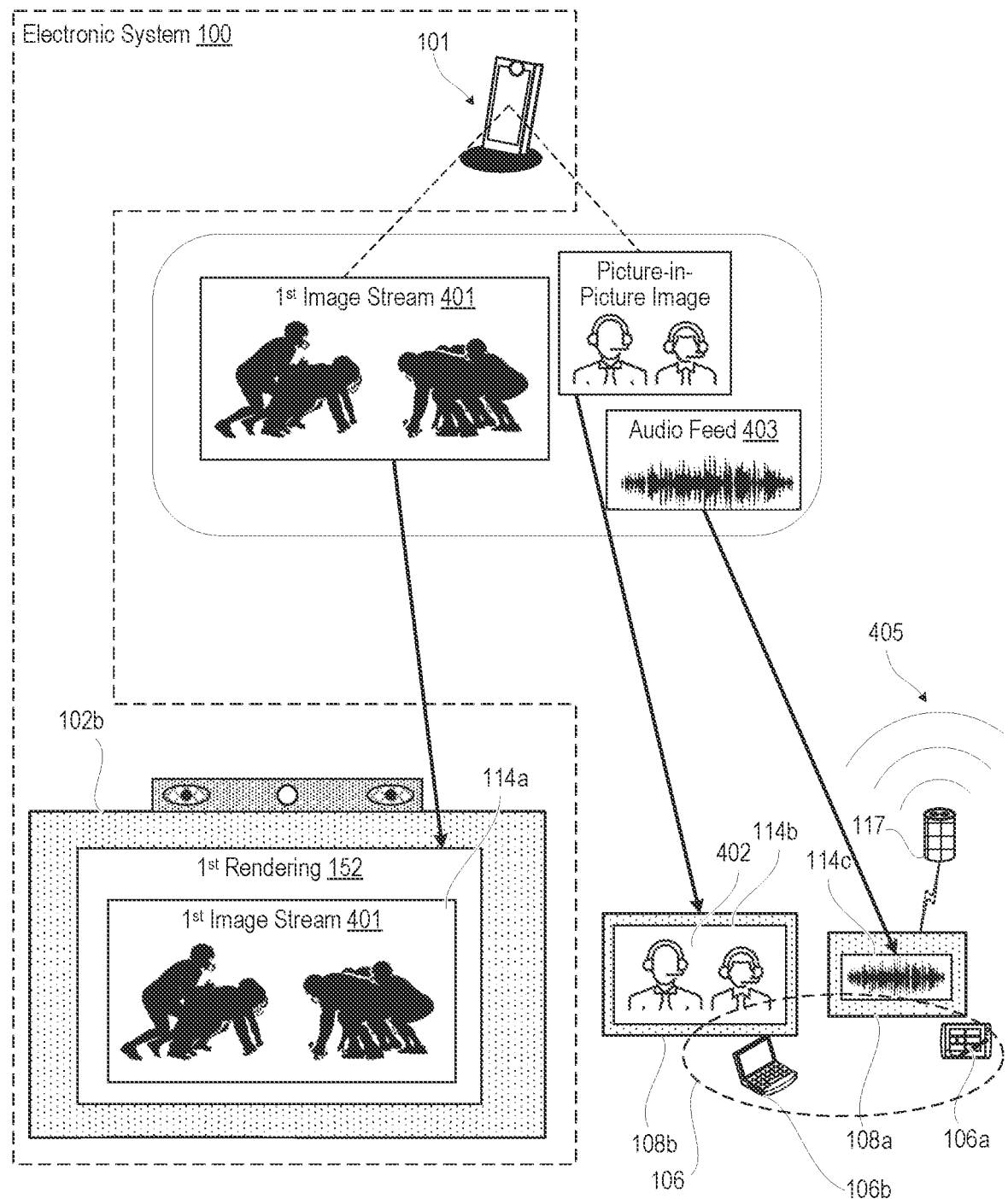
FIG. 4 is a diagram of the electronic system managing segregation and parallel processing and presentation of multiple media streams by connected devices, according to one or more embodiments.

FIG. 4 is a diagram of electronic system 100 including electronic device 101, such as communication device 201 (FIG. 2), managing segregation and parallel processing and presentation of computer data file 114, including three (3) segregable functional portions 114a-114c. First segregable functional portions 114a includes include first image stream 401, such as a main video picture of a sports event. Based on the larger format size of first image stream 401, electronic device 101 assigns first segregable functional portions 114*a* to first external display 102*b* for decoding and presenting first rendering 152 of first image stream 401. Based on a smaller format size of picture-in-picture image stream 402, electronic device 101 assigns second segregable functional portions 114*b* to second display 108*b* of laptop 106*b* for decoding and presenting second rendering 154*a* of picture-in-picture image stream 402. To offload processing workload or to utilize better sound output capability, electronic device 101 assigns third segregable functional portions 114*c* to tablet 106*a* for decoding and presenting audio output 405 of audio feed 403.

Figure 5A:
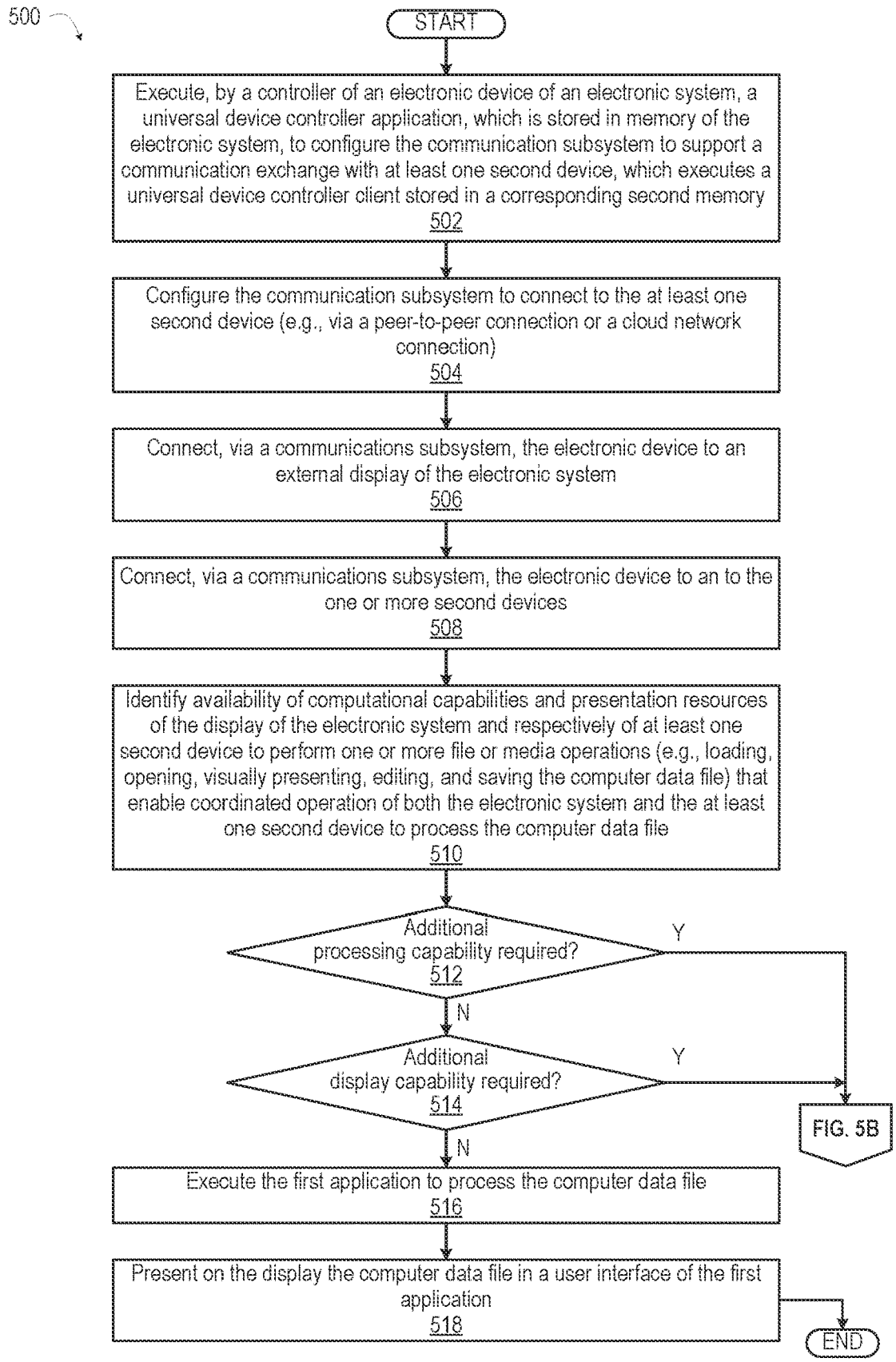

FIGS. 5A-5B (collectively "FIG. 5") are a flow diagram presenting method 500 of managing computation and presentation capabilities of connected devices by distributing processing and presentation functions across the different connected devices, in part based on the specific capabilities of each of the connected devices. With each individual device being individually inadequate to process and present the entire computer data file, a user of the electronic device 101 (or communication device 201, FIG. 2) can concurrently control and view processing of the computer data file using a more than one mobile device. The descriptions of method 500 (FIG. 5) is provided with general reference to the specific components illustrated within the preceding FIGS. 1-4. Specific components referenced in method 500 (FIG. 5) may be identical or similar to components of the same name used in describing preceding FIGS. 1-4. In one or more embodiments, controller 110 (FIG. 1) configures electronic device 101 or communication device 201 (FIGS. 1 and 2) to provide the described functionality of method 500 (FIG. 5).

With reference to FIG. 5A, in one or more embodiments, method 500 includes executing, by a controller of an electronic device of an electronic system, a universal device controller application, stored in memory of the electronic device, to configure the communications subsystem of the device to support a communication exchange with at least one second device, which executes a universal device controller client stored in a corresponding second memory (block 502). Universal device controller (UDC) technology may be implemented at both the electronic device and the at least one second device to collaboratively work as an intermediary control channel between a first application executed by the electronic device and a second application executed at one of the at least one second electronic devices. In one or more embodiments, method 500 includes configuring the communications subsystem to connect to the at least one second device (e.g., via a peer-to-peer connection or a cloud network connection) (block 504). In one or more embodiments, electronic system consists essentially or wholly of electronic device. In one or more embodiments, electronic system includes electronic device and one or more external displays. In an example, the electronic device is a handheld mobile device with a small display that is communicatively connectable to a large external display (e.g., display monitor) via a wired or wireless network connection. Presentation capabilities of the electronic system are determined based on currently available displays, which may be the small display of the electronic device and/or the large external display. In another example, the electronic system consists essentially of the electronic device which may be a tablet, laptop, or desktop workstation with dedicated display monitor(s) with corresponding presentation capabilities that do not change. Thus, method 500 may include connecting, via a communications subsystem, the electronic device to an external display of the electronic system (block 506). Method 500 includes connecting, via the communication subsystem, the electronic device to the one or more second devices (block 508). The electronic device has a controller and the memory that stores a first application configured to process and present at least one portion of a computer data file. Each of the second devices has a processing subsystem and a second memory that stores a second application. Both of the first and the second applications have capabilities to perform one or more file or media processing and presentation steps. By executing the second application, one of the at least one second devices is capable of performing certain functions autonomously to the electronic system, providing an augmentation to processing and/or presentation capabilities of the electronic system.

Method 500 includes identifying or determining availability of computational capabilities and presentation resources of the electronic device and respectively of at least one second device to perform one or more file or media operations (e.g., loading, opening, visually presenting, editing, and saving the computer data file) that enable coordinated operation of both the electronic device and the at least one second device to process the computer data file (block 510). Method 500 includes determining whether additional processing capability is required to enable efficient processing of the computer data file than is currently available for allocation within the electronic system (decision block 512). In response to determining that additional processing capability is not required, method 500 includes determining whether additional display capability is required to present the computer data file in a graphical user interface generated by the first application (decision block 514). In response to determining that additional display capability is not required, method 500 includes executing the first application to process the computer data file on the local electronic device (block 516). Method 500 includes presenting, on at least one first display of the electronic system, the computer data file in a user interface generated for the first application (block 518). Then method 500 ends.

In response to at least one of: (i) determining, in decision block 512, that additional processing capability is required to enable efficient processing of the computer data file than is currently available for allocation within the electronic device; or (ii) determining, in decision block 514, that additional display capability is required to present the computer data file in a user interface generated by the first application, method 500 proceeds to block 520 of FIG. 5B.

With reference to FIG. 5B, method 500 includes segregating the computer data file into multiple segregable functional portions by splitting the computer data file to generate the at least one first segregable functional portion and the at least one second segregable functional portion (block 520). Method 500 includes assigning the at least one first segregable functional portion and the at least one second segregable functional portion, based on the respective computation and presentation capabilities of the electronic system and the at least one second device (block 522). Method 500 includes executing the first application to process at least one first segregable functional portion of the computer data file (block 524). Method 500 includes presenting the at least one first segregable functional portion on the display (block 526). Method 500 includes communicating at least one second segregable functional portion of the computer data file, via the communications subsystem, to the at least one second device for processing and presenting (block 528). In one or more embodiments, communicating the at least one second segregable functional portion to the at least one second device is performed by providing, to the at last one second device, retrieval information at the network storage location at which the computer data file is stored. Method 500 includes triggering, via the communication exchange, the at least one second device to execute the second application to process and present the second segregable functional portion of the computer data file (block 530). Method 500 includes identifying or determining whether processing of the computer data file is completed at the electronic device and at the at least one second device (decision block 532). In response to determining that processing of the computer data file is not completed, method 500 returns to block 524. In response to determining that processing of the computer data file is completed, method 500 includes receiving, via the communications subsystem from the at least one second device, the at least one second segregable functional portion as modified at the at least one second device (block 534). Method 500 includes generating a modified computer data file by assembling the at least one first and the at least one second segregable functional portions, as respectively modified (block 536). Method 500 includes storing the modified computer data file (block 538). Then method 500 ends.

In one or more embodiments, the computer data file is a spreadsheet data file. The at least one first functional portion is at least one first worksheet tab of the spreadsheet data file. The at least one second functional portion is at least one second worksheet tab of the spreadsheet data file that is different from the at least one first worksheet tab.

In one or more embodiments, the computer data file is an audiovisual media file. The at least one first functional portion includes at least one first encoded media stream that is decoded, rendered, and presented by the electronic device. The at least one second functional portion includes at least one second encoded media stream that is decoded, rendered, and presented by the at least one second device.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic system comprising:
   at least one first display;
   a memory that stores a first application configured to process and present at least one portion of a computer data file;
   a communications subsystem configurable to connect the electronic system to one or more second devices having a processing subsystem, a second display, and a second memory that stores a second application; and
   a controller communicatively connected to the memory and the communications subsystem, and which:
   identifies availability of computational and presentation resources of at least one second device to enable coordinated operation of both the electronic system and the at least one second device to process the computer data file;
   configures the communications subsystem to connect to the at least one second device;
   segregates the computer data file into multiple segregable functional portions;
   executes the first application to process at least one first segregable functional portion of the computer data file;
   presents the at least one first segregable functional portion on a display;
   communicates at least one second segregable functional portion of the computer data file, via the communications subsystem, to the at least one second device for processing and presenting; and
   triggers the at least one second device to execute the second application to process and present the second segregable functional portion of the computer data file.

2. The electronic system of claim 1, wherein:
the memory stores a universal device controller application;
each of the at least one second device has a universal device controller client stored in a corresponding second memory; and
the controller:
executes the universal device controller application to configure the communications subsystem to support a communication exchange with the at least one second device, which executes the universal device controller client; and
triggers, via the communication exchange, the at least one second device to execute the second application.

3. The electronic system of claim 1, wherein the controller segregates the computer data file in response to determining additional processing capability to enable efficient processing of the computer data file than is currently available for allocation within the electronic system.

4. The electronic system of claim 1, wherein the controller segregates the computer data file in response to determining additional display capability is required to present the computer data file in a user interface generated by the first application.

5. The electronic system of claim 1, wherein the controller:
determines respective computational capabilities of the electronic system and the at least one second device to perform one or more file or media operations of a group comprising loading, opening, visually presenting, editing, and saving the computer data file; and
splits the computer data file to generate the at least one first segregable functional portion and the at least one second segregable functional portion and assigns the at least one first segregable functional portion and the at least one second segregable functional portion, based on the respective computation capabilities of the electronic system and the at least one second device.

6. The electronic system of claim 1, further comprising an electronic device comprising the memory, the communications subsystem, and the controller, wherein:
the at least one first display comprises at least one external display; and
the controller:
communicatively couples to the at least one external display via the communications subsystem;
identifies presentation resources of the at least one external display; and
splits the computer data file to generate the at least one first segregable functional portion and the at least one second segregable functional portion and assigns the at least one first segregable functional portion and the at least one second segregable functional portion, based at least in part on respective presentation capabilities of the at least one external display and the at least one second device.

7. The electronic system of claim 1, wherein the controller:
in response to identifying a completion of processing the computer data file:
receives, via the communications subsystem from the at least one second device, the at least one second segregable functional portion as modified at the at least one second device; and
generates a modified computer data file by assembling the at least one first and the at least one second segregable functional portions, as respectively modified; and
stores the modified computer data file.

8. The electronic system of claim 1, wherein the controller:
identifies availability of computational and presentation resources of the at least one second device based on identifying the at least one second device as a trusted peer-to-peer device; and
configures the communications subsystem to connect to the at least one second device via a secure peer-to-peer connection.

9. The electronic system of claim 8, wherein the computer data file is stored at a network storage location and controller communicates the at least one second segregable functional portion to the at least one second device by providing retrieval information at the network storage location to at last one second device.

10. The electronic system of claim 1, wherein:
the computer data file comprises a spreadsheet data file;
the at least one first functional portion comprises at least one first worksheet tab of the spreadsheet data file; and
the at least one second functional portion comprises at least one second worksheet tab of the spreadsheet data file that is different from the at least one first worksheet tab.

11. The electronic system of claim 1, wherein:
the computer data file comprises an audiovisual media file;
the at least one first functional portion comprises at least one first encoded media stream that is decoded, rendered, and presented by the electronic system; and
the at least one second functional portion comprises at least one second encoded media stream that is decoded, rendered, and presented by the at least one second device.

12. A method comprising:
connecting, via a communications subsystem, an electronic system to one or more second devices, the electronic system having a controller and a memory that stores a first application configured to process and present at least one portion of a computer data file, each of the second devices having a processing subsystem and a second memory that stores a second application;
identifying availability of computational and presentation resources of at least one second device to enable coordinated operation of both the electronic system and the at least one second device to process the computer data file;
configuring the communications subsystem to connect to the at least one second device;
segregating the computer data file into multiple segregable functional portions;
executing the first application to process at least one first segregable functional portion of the computer data file;
presenting the at least one first segregable functional portion on a display;
communicating at least one second segregable functional portion of the computer data file, via the communications subsystem, to the at least one second device for processing and presenting; and
triggering the at least one second device to execute the second application to process and present the second segregable functional portion of the computer data file.

13. The method of claim 12, wherein:
the memory stores a universal device controller application;
each of the at least one second device has a universal device controller client stored in a corresponding second memory; and
the method further comprises:
executing the universal device controller application to configure the communications subsystem to support a communication exchange with the at least one second device, which executes the universal device controller client; and
triggering, via the communication exchange, the at least one second device to execute the second application.

14. The method of claim 12, wherein segregating the computer data file is in response to at least one of: (i) determining additional processing capability to enable efficient processing of the computer data file than is currently available for allocation within the electronic system; and (ii) determining additional display capability is required to present the computer data file in a user interface generated by the first application.

15. The method of claim 12, further comprising:
determining respective computational capabilities of the electronic system and the at least one second device to perform one or more file or media operations of a group comprising loading, opening, visually presenting, editing, and saving the computer data file; and
splitting the computer data file to generate the at least one first segregable functional portion and the at least one second segregable functional portion and assigning the at least one first segregable functional portion and the at least one second segregable functional portion, based on the respective computation capabilities of the electronic system and the at least one second device.

16. The method of claim 15, wherein:
the electronic system comprises an electronic device having the memory, the communications subsystem, and the controller;
the at least one first display comprises at least one external display; and
the method further comprises:
communicatively coupling to the at least one external display via the communications subsystem;
identifying presentation resources of the at least one external display; and
splitting the computer data file to generate the at least one first segregable functional portion and the at least one second segregable functional portion and assigning the at least one first segregable functional portion and the at least one second segregable functional portion, based at least in part on the respective presentation capabilities of the at least one external display and the at least one second device.

17. The method of claim 12, further comprising:
in response to identifying a completion of processing the computer data file:
receiving, via the communications subsystem from the at least one second device, the at least one second segregable functional portion as modified at the at least one second device;
generating a modified computer data file by assembling the at least one first and the at least one second segregable functional portions, as respectively modified; and
storing the modified computer data file.

18. The method of claim 12, further comprising:
identifying availability of computational and presentation resources of the at least one second device based on identifying the at least one second device as a trusted peer-to-peer device; and
configuring the communications subsystem to connect to the at least one second device via a secure peer-to-peer connection.

19. The method of claim 18, wherein the computer data file is stored at a network storage location and the method further comprises communicating the at least one second segregable functional portion to the at least one second device by providing retrieval information at the network storage location to at last one second device.

20. A computer program product comprising:
a computer readable storage device; and
program code on the computer readable storage device that when executed by a processor associated with an electronic device, the program code enables the electronic device to provide functionality of:
connecting, via a communications subsystem, the electronic device to one or more second devices, the electronic device having a controller and a memory that stores a first application configured to process and present at least one portion of a computer data file, each of the second devices having a processing subsystem and a second memory that stores a second application;
identifying availability of computational and presentation resources of at least one second device to enable coordinated operation of both the electronic device and the at least one second device to process the computer data file;
configuring the communications subsystem to connect to the at least one second device;
segregating the computer data file into multiple segregable functional portions;
executing the first application to process at least one first segregable functional portion of the computer data file;
presenting the at least one first segregable functional portion on a display;
communicating at least one second segregable functional portion of the computer data file, via the communications subsystem, to the at least one second device for processing and presenting; and
triggering the at least one second device to execute the second application to process and present the second segregable functional portion of the computer data file.

* * * * *